(12) United States Patent
Nilsson et al.

(10) Patent No.: US 6,201,637 B1
(45) Date of Patent: Mar. 13, 2001

(54) LONG-WAVELENGTH OPTICAL FIBER AMPLIFIER

(75) Inventors: Johan Nilsson, Suwon; Jeong-mee Kim, Yongin; Sung-jun Kim, Pyeongtaek, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/366,560

(22) Filed: Aug. 4, 1999

(30) Foreign Application Priority Data

Aug. 4, 1998 (KR) .................................................. 98-31702

(51) Int. Cl.⁷ ...................................................... H01S 3/13
(52) U.S. Cl. .......................... 359/341; 359/169; 359/347; 372/6; 372/71
(58) Field of Search ..................................... 359/160, 169, 359/170, 174, 176, 337, 341, 347; 372/4, 6, 71

(56) References Cited

U.S. PATENT DOCUMENTS

| | | |
|---|---|---|
| 5,088,095 | 2/1992 | Zirngibl . |
| 5,268,910 | 12/1993 | Huber . |
| 5,361,161 | 11/1994 | Baney et al. . |
| 5,623,362 * | 4/1997 | Mitsuda et al. ........................ 359/134 |
| 5,867,306 * | 2/1999 | Isshiki .................................. 359/341 |
| 5,917,648 * | 6/1999 | Harker .................................. 359/341 |
| 5,963,361 * | 10/1999 | Taylor et al. ........................ 359/337 |

FOREIGN PATENT DOCUMENTS

| | | |
|---|---|---|
| 0524558 A2 | 1/1993 | (EP) . |
| 0 772 264 | 5/1997 | (EP) . |
| 0 954 070 | 11/1999 | (EP) . |
| 2283126 | 4/1995 | (GB) . |

OTHER PUBLICATIONS

Nilsson et al, IEEE Photonics Tech. Letters, vol. 10, #11, pp. 1551–1553, Nov. 1998.*

Kareseh, M.; IEEE Photonics Tech. Letters, vol. 11, #9, pp. 1111–1113, Sep. 1999.*

Paper: "Low–noise and high–gain 1.58$\mu$m band $Er^{3+}$—doped free amplifiers with cascade configurations" (Electronics Letters, vol. 33, No. 17, 1997) Ono et al. published date Jun. 25, 1997.

* cited by examiner

*Primary Examiner*—Nelson Moskowitz
(74) *Attorney, Agent, or Firm*—Robert E. Bushnell, Esq.

(57) ABSTRACT

An long-wavelength optical fiber amplifier includes an erbium doped optical fiber (EDF) for amplifying an input signal light having a wavelength in the range of 1580 nanometers (nm) using pump light, a pumping unit positioned in front of and to the rear of the erbium doped optical fiber, for supplying the pump light to the erbium doped optical fiber, and an amplified spontaneous emission (ASE) reflecting unit positioned in front of the pumping unit, for coupling backward amplified spontaneous emission generated in the erbium doped optical fiber to the long-wavelength input signal light and inputting again the same to the erbium doped optical fiber. Fewer laser diodes and optical devices are necessary in amplifying an signal light having a long wavelength, by providing a reflector for reflecting amplified spontaneous emission. Also, the gain is increased in the case when the power of an input signal is small.

20 Claims, 4 Drawing Sheets

LONG-WAVELENGTH OPTICAL FIBER AMPLIFIER

CLAIM OF PRIORITY

This application makes reference to, incorporates the same herein, and claims all benefits accruing under 35 U.S.C. §119 from an application entitled LONG-WAVELENGTH OPTICAL FIBER AMPLIFIER earlier filed in the Korean Industrial Property Office on the $4^{th}$ of August 1998, and there duly assigned Ser. No. 31702/1998, a copy of which is annexed hereto.

BACKGROUND OF THE INVENTION

1. Technical Field

The present invention relates to a long-wavelength optical fiber amplifier, and more particularly, to an optical fiber amplifier for amplifying a long-wavelength optical signal in the range of 1580 nanometers.

2. Related Art

In an optical transmission system, an erbium doped fiber amplifier (EDFA) can be used to directly amplify optical signals which become weak during transmission. This amplification of the optical signals can be performed without converting the optical signals into electrical signals. Thus, the transmission distance can be markedly increased.

I have found that a large amount of power can be required when amplifying a long-wavelength optical signal in the wavelength range of 1580 nanometers (nm). Unfortunately, there is not currently available an adequate method for efficiently and conveniently amplifying a long-wavelength optical signal.

SUMMARY OF THE INVENTION

To solve the above problems and others, it is an objective of the present invention to provide a long wavelength optical fiber amplifier for increasing the gain of long-wavelength amplification and suppressing short-wavelength amplification.

To solve the above problems and others, it is a further objective of the present invention to provide a long wavelength optical fiber amplifier for increasing the gain of long-wavelength amplification and suppressing short-wavelength amplification, by which population inversion of erbium ions necessary for long-wavelength amplification is realized with respect to erbium ions in an erbium doped fiber, by providing a reflector capable of reflecting amplified spontaneous emission (ASE) generated when amplifying signal light.

Accordingly, to achieve the above objectives and others, there is provided a long-wavelength optical fiber amplifier including an erbium doped optical fiber (EDF) for amplifying an input signal light having a wavelength in the range of 1580 nm using pump light, a pumping unit positioned in front of and to the rear of the erbium doped optical fiber, for supplying the pump light to the erbium doped optical fiber, and an amplified spontaneous emission (ASE) reflecting unit positioned in front of the erbium doped optical fiber and the pumping unit, for coupling amplified spontaneous emission generated in the erbium doped optical fiber to the long-wavelength input signal light and outputting the same to the erbium doped optical fiber.

According to another aspect of the present invention, there is provided a long-wavelength optical fiber amplifier including an erbium doped optical fiber for amplifying an input signal light having a wavelength in the range of 1580 nm using pump light, a pumping unit positioned in front of and to the rear of the erbium doped optical fiber, for generating the pump light to excite erbium ions in the erbium doped optical fiber, and an amplified spontaneous emission (ASE) reflecting unit positioned to the rear of the pumping unit, for reflecting amplified spontaneous emission generated in the erbium doped optical fiber to the erbium doped optical fiber.

According to still another aspect of the present invention, there is provided a long-wavelength optical fiber amplifier including an erbium doped optical fiber (EDF) for amplifying an input signal light having a wavelength in the range of 1580 nm using pump light, a pumping unit positioned in front of and to the rear of the erbium doped optical fiber, for generating the pump light to excite erbium ions in the erbium doped optical fiber, a first amplified spontaneous emission (ASE) reflecting unit positioned in front of the pumping unit, for coupling amplified spontaneous emission generated in the erbium doped optical fiber to the long-wavelength input signal light and inputting again the same to the erbium doped optical fiber, and a second amplified spontaneous emission reflecting unit positioned to the rear of the pumping unit, for reflecting amplified spontaneous emission generated in the erbium doped optical fiber to the erbium doped optical fiber and inputting again the same to the erbium doped optical fiber.

To achieve these and other objects in accordance with the principles of the present invention, as embodied and broadly described, the present invention provides an apparatus, comprising: an optical fiber having an input port and an output port, receiving signal light to said input port, amplifying the signal light using pump light, outputting amplified signal light from said output port, the signal light having a wavelength at or near 1580 nanometers, said signal light traveling in a first direction; a pumping unit being connected to said input and output ports, supplying the pump light to said input and output ports; and a reflecting unit being connected to said pumping unit, coupling amplified spontaneous emission generated in said optical fiber with the signal light, conveying the amplified spontaneous emission coupled with the signal light to said input port.

To achieve these and other objects in accordance with the principles of the present invention, as embodied and broadly described, the present invention provides a long-wavelength optical fiber amplifier apparatus, comprising: an optical fiber being erbium doped, said optical fiber amplifying a signal light having a wavelength at or near 1580 nanometers using pump light, said optical fiber having an input port and an output port, said optical fiber receiving the signal light at said input first port, the signal light traveling in a first direction; a pumping unit having a first pump section connected to said input port and a second pump section connected to said output port, said pumping unit generating the pump light to excite erbium ions in said optical fiber; and a reflecting unit being connected to said second pump section, said reflecting unit receiving amplified spontaneous emission traveling in said first direction from said output port through said second pump section, the amplified spontaneous emission being generated in said optical fiber, said reflecting unit reflecting the amplified spontaneous emission back to said output port of said optical fiber in a second direction opposite to said first direction.

To achieve these and other objects in accordance with the principles of the present invention, as embodied and broadly described, the present invention provides an apparatus, comprising: an optical fiber having an input port and an output port, being doped with erbium, receiving signal light at said input port, amplifying the signal light using pump light, outputting amplified signal light at said output port, the signal light having a wavelength at or near 1580 nanometers, the signal light traveling in a first direction; a pumping unit having a first pump section connected to said input port and a second pump section connected to said output port, said first and second pump sections generating the pump light to excite erbium ions in said optical fiber; a first reflecting unit being connected to said first pump section, receiving first amplified spontaneous emission traveling in a second direction from said input port through said first pump section, coupling the first amplified spontaneous emission with the signal light, and conveying the first amplified spontaneous emission coupled with the signal light to said input port of said optical fiber, the first amplified spontaneous emission being generated in said optical fiber, said second direction being opposite to said first direction; and a second reflecting unit being connected to said second pump section, receiving second amplified spontaneous emission traveling in said first direction from said output port through said second pump section, and reflecting the second amplified spontaneous emission back to said output port of said optical fiber in said second direction, the second amplified spontaneous emission being generated in said optical fiber.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

In an optical transmission system, an erbium doped fiber amplifier (EDFA) can be used to directly amplify optical signals which become weak during transmission. This amplification of the optical signals can be performed without converting the optical signals into electrical signals. Thus, the transmission distance can be markedly increased. In wavelength division multiplexing (WDM) transmission methods, the demand for gain-flattened EDFAs is increasing. Also, in order to transmit a larger capacity of data, simulcasting of many more channels is necessary. To this end, a flat, wide band is required. It is necessary to amplify an optical signal in the wavelength range of 1580 nanometers (nm), which has not been used conventionally.

Figure 1:
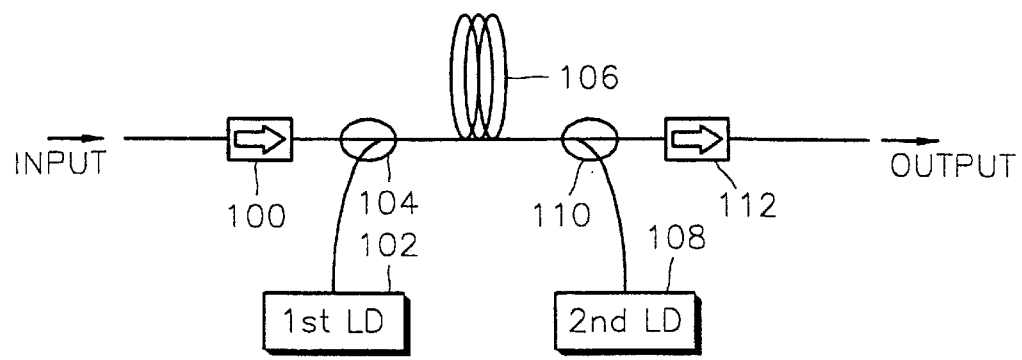
FIG. 1 is a schematic diagram of a long-wavelength optical fiber amplifier.

FIG. 1 is a schematic diagram of an optical fiber amplifier. The optical fiber amplifier shown in FIG. 1 includes a first isolator 100, a first laser diode (LD) 102, a first wavelength selective coupler (WSC) 104, an erbium doped optical fiber (EDF) 106, a second laser diode 108, a second wavelength selective coupler 110 and a second isolator 112, and operates as follows.

The first wavelength selective coupler 104 couples input signal light to pump light generated in the first laser diode 102 and outputs the coupled light to the erbium doped optical fiber 106. The pump light generated in the second laser diode 108 positioned at the rear end of the erbium doped optical fiber 106 is incident to the erbium doped optical fiber 106 through the second wavelength selective coupler 110. The forward and backward incident pump light excites erbium ions in a ground state in the erbium doped optical fiber 106. The signal light is amplified by stimulated emission of the excited erbium ions. Amplified spontaneous emission (ASE) generated in the erbium doped optical fiber 106 is reflected from an optical element such as a signal input/output connector. The first and second isolators 100 and 112 prevent the amplified spontaneous emission from being fed back to the erbium doped optical fiber 106, and thereby prevent the amplifying efficiency of the signal light from lowering.

Such an amplifier requires a pump light power of about 100 milliwatts (mW) in amplifying a wavelength in the range of 1550 nanometers. However, when amplifying a wavelength in the range of 1580 nm, a large power of about 600 mW is required. Thus, in the case of using a laser diode having a maximum output power of about 150 mW, many laser diodes and special optical devices are necessary and it is also difficult to handle these components.

Figure 2:
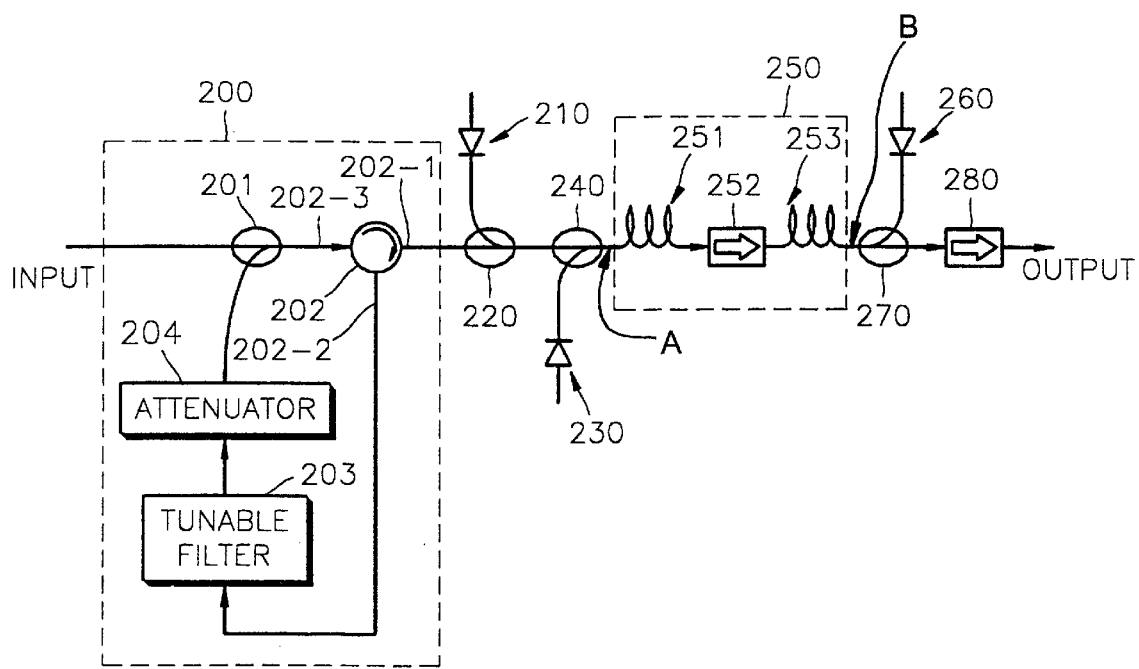
FIG. 2 is a schematic diagram of one embodiment of a long-wavelength optical fiber amplifier, in accordance with the principles of the present invention.

Referring to FIG. 2, the long-wavelength optical fiber amplifier according to the present invention includes a reflecting unit 200 for outputting input signal light and predetermined reflected light, a first laser diode 210 for generating pump light in the range of 1480 nm, a first wavelength selective coupler 220 for coupling the pump light in the range of 1480 nm to the light output from the reflecting unit 200, a second laser diode 230 for generating pump light in the range of 980 nm, a second wavelength selective coupler (WSC) 240 for coupling the pump light in the range of 980 nm to the light input from the first wavelength selective coupler 220, an erbium doped optical fiber (EDF) unit 250, a third laser diode 260 for generating pump light in the range of 1480 nm, a third wavelength selective coupler (WSC) 270 for coupling the pump light in the range of 1480 nm to the erbium doped optical fiber unit 250 and allowing the amplified light output from the erbium doped optical fiber unit 250 to pass through the same, and an isolator 280. Here, since the insertion loss of each passive device is only about 0.2 decibels (dB) higher in the wavelength range of 1580 nm than in the 1550 nm range, the passive devices used in the range of 1550 nm can also be used in the range of 1580 nm. As is well known, a wavelength in the range of 1580 nm corresponds to a wavelength in the 1580 nm wavelength band. The reflecting unit 200 includes a 3 dB coupler 201, a circulator 202, a tunable filter 203 and an attenuator 204. The erbium doped optical fiber unit 250 includes erbium doped optical fibers 251 and 253 and a second isolator 252 interposed between the erbium doped optical fibers 251 and 253. The lengths of the erbium doped optical fibers 251 and 253 are about 10 to 20 times longer than the erbium doped optical fiber used in an optical fiber amplifier having the wavelength range of 1550 nm.

The EDF unit 250 has an input port A, also known as an upstream port, adjacent to the second WSC 240. The EDF unit 250 has an output port B, also known as a downstream port, adjacent to the third WSC 270. The EDF unit 250 receives signal light into the input port via the load reflecting unit 200. The EDF unit 250 outputs signal light from the output port to the isolator 280.

The operation of the optical fiber amplifier having the above-described configuration will now be described. The first laser diode 210 generates pump light in the range of 1480 nm, and the second laser diode 230 generates pump light in the range of 980 nm. The pump light from the first laser diode 210 and the second laser diode 230 is coupled to signal light in the range of 1580 nm through the first and second wavelength selective couplers 220 and 240, respectively, to then enter the erbium doped optical fiber unit 250 in a forward direction. The third laser diode 260 generates pump light in the range of 1480 nm, and the third wavelength selective coupler 270 applies the generated pump light to the erbium doped optical fiber unit 250 in abackward direction. The pump light is in the wavelength range of 980 nm having low noise and in the wavelength range of 1480 nm having the maximum power. If the pump light in the ranges of 980 nm and 1480 nm is incident, large amplified spontaneous emission in the range of 1530 to 1560 nm is generated at the ends of the erbium doped optical fiber unit 250 so that amplification of signal light in the range of 1580 nm becomes worse. Here, reduction in the loss due to amplified spontaneous emission and an increase in the gain of long-wavelength amplification can be accompanied by using a long-wavelength pump light in the range of 1550 nm. However, a pump light source for this range of wavelength has not yet been developed.

The erbium doped optical fiber unit 250 amplifies signal light in the range of 1580 nm using the respective pump light. The second isolator 252 is interposed between the erbium doped optical fibers 251 and 253, thereby improving noise characteristics. The second isolator 252 helps to reduce undesired noise and undesired return reflections along the transmission path. Thus, the second isolator 252 improves transmission characteristics.

The reflecting unit 200 reflects backward amplified spontaneous emission generated in the erbium doped optical fiber unit 250 which is incident into its input end, and allows the same to feedback to the erbium doped optical fiber unit 250. The circulator 202 outputs the backward amplified spontaneous emission fed back through a first port 202-1 to a second port 202-2. A tunable filter 203 and an attenuator 204 adjust wavelength and power of the backward amplified spontaneous emission. A 3 decibel (dB) coupler 201 outputs the output of the attenuator 204 to a third port 202-3 of the circulator 202. The circulator 202 outputs the backward amplified spontaneous emission to the first port 202-1 and then inputs again the same to the erbium doped optical fiber 250. The circulator 202 also acts as an isolator. The first, second, and third ports 202-1, 202-2, and 202-3 can also be referred to as first, second, and third terminals.

The amplified spontaneous emission re-incident to the erbium doped optical fibers 251 and 253 from the first port 202-1 of the circulator 202 suppresses highly inversed population of the erbium doped optical fibers 251 and 253 by the pump light to assist amplification of a long-wavelength signal light.

Figure 3:
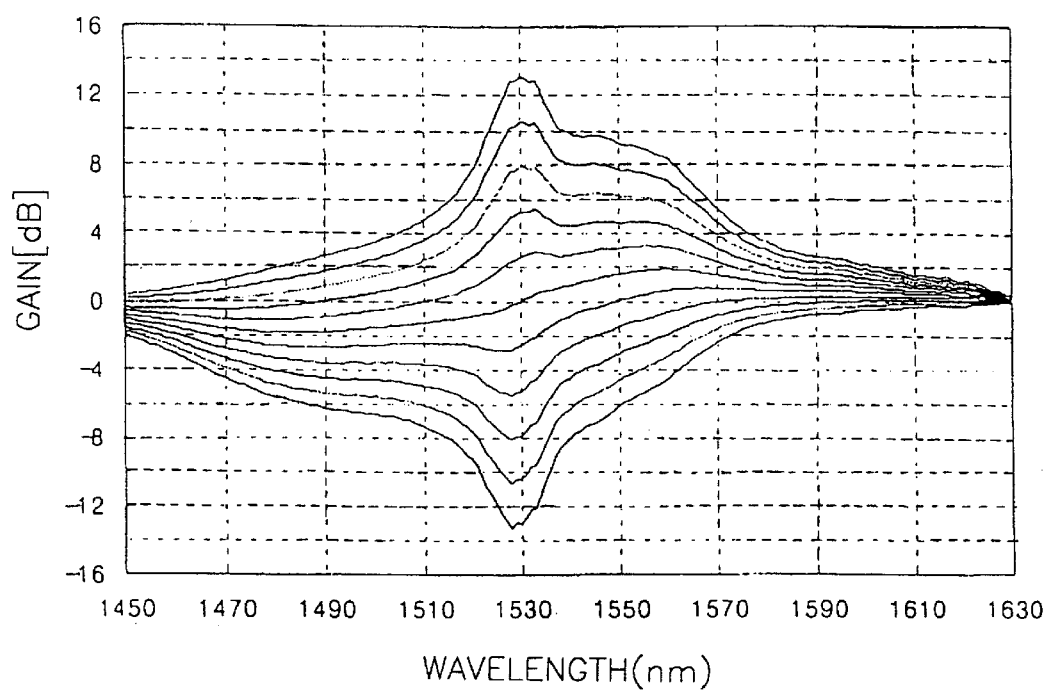
FIG. 3 illustrates gain characteristics depending on population inversion distribution.

FIG. 3 illustrates gain characteristics depending on population inversion distribution. Referring to FIG. 3, in the case of high population inversion, the wavelength range of 1530 to 1560 nm is largely amplified, and in the case of low population inversion, amplification in the wavelength range of 1580 nm is possible. Thus, amplified spontaneous emission is used for the purpose of adjusting the population inversion caused by pump light to be suitable for amplification of the long-wavelength signal light. In other words, the amplified spontaneous emission re-incident from the circulator 202 weakens the population inversion distribution of the erbium ions excited in the erbium doped optical fibers 251 and 253, thereby reducing or eliminating the gain of a short wavelength in the range of 1530 to 1560 nm, and the loss due to the amplified spontaneous emission. Also, since the amplified spontaneous emission is absorbed again while passing through a long erbium doped optical fiber being weakly affected by pump light from both ends of the erbium doped optical fiber having high population inversion, the amplified spontaneous emission increases the signal gain at long wavelengths without loss with the pump light. The gain and output power differ depending on the wavelengths and power of the fed-back amplified spontaneous emission.

The isolator 280 prevents the amplified spontaneous emission generated in the erbium doped optical fiber unit 250 from being reflected by an output connector or the like and feeding back to the same.

Figure 4:
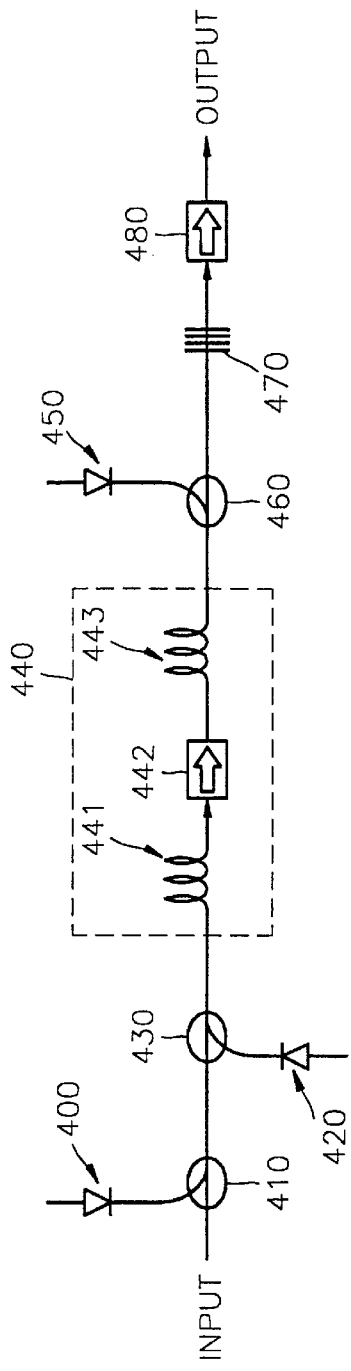
FIG. 4 is a schematic diagram of another embodiment of a long-wavelength optical fiber amplifier, in accordance with the principles of the present invention.

FIG. 4 is a schematic diagram of a long-wavelength optical fiber amplifier according to another embodiment of the present invention. The optical fiber amplifier shown in FIG. 4 includes a first laser diode 400 for generating pump light in the range of 1480 nm, a first wavelength selective coupler 410 for coupling the pump light in the range of 1480 nm to input signal light, a second laser diode 420 for generating pump light in the range of 980 nm, a second wavelength selective coupler 430 for coupling the pump light in the range of 980 nm to the light output from the first wavelength selective coupler 410, an erbium doped optical fiber unit 440, a third laser diode 450 for generating pump light in the range of 1480 nm, a third wavelength selective coupler 460 for inputting the pump light in the range of 1480 nm to the erbium doped optical fiber unit 440 and allowing the light output from the erbium doped optical fiber unit 440 to pass through the same, a reflector 470 and an isolator 480.

The erbium doped optical fiber unit 440 includes erbium doped optical fibers 441 and 443 and a second isolator 442 interposed between the erbium doped optical fibers 441 and 443. The lengths of the erbium doped optical fibers 441 and 443 are about 10 to 20 times longer than an erbium doped optical fiber used in an optical fiber amplifier having the wavelength range of 1550 nm.

Figure 5:
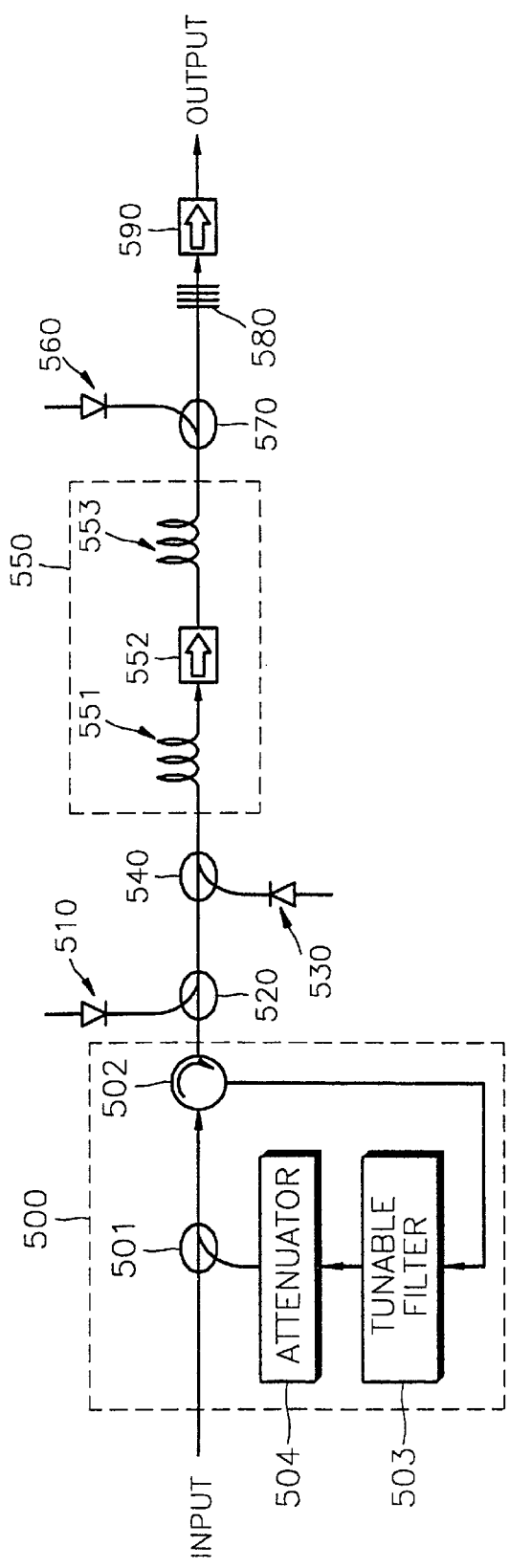
FIG. 5 is a schematic diagram of still another embodiment of a long-wavelength optical fiber amplifier, in accordance with the principles of the present invention.
Figure 6:
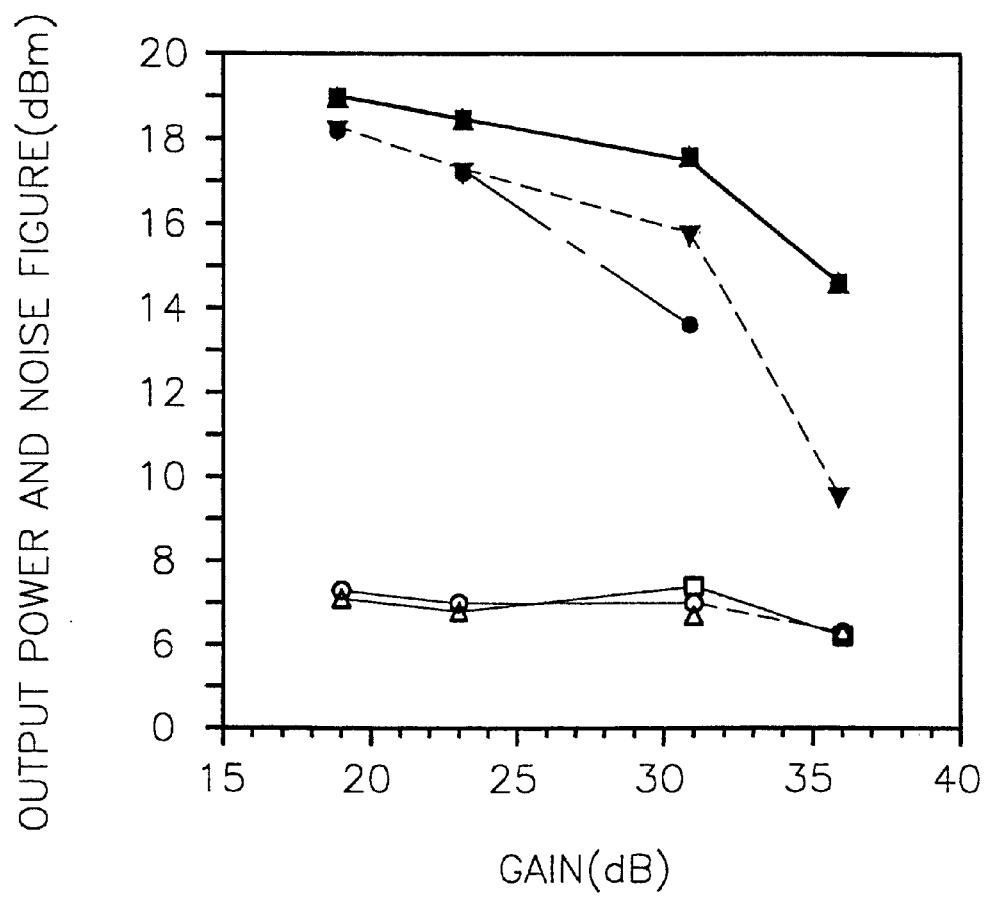
FIG. 6 illustrates experimental results for the optical fiber amplifiers shown in FIGS. 2, 4, and 5.
Figure 6:
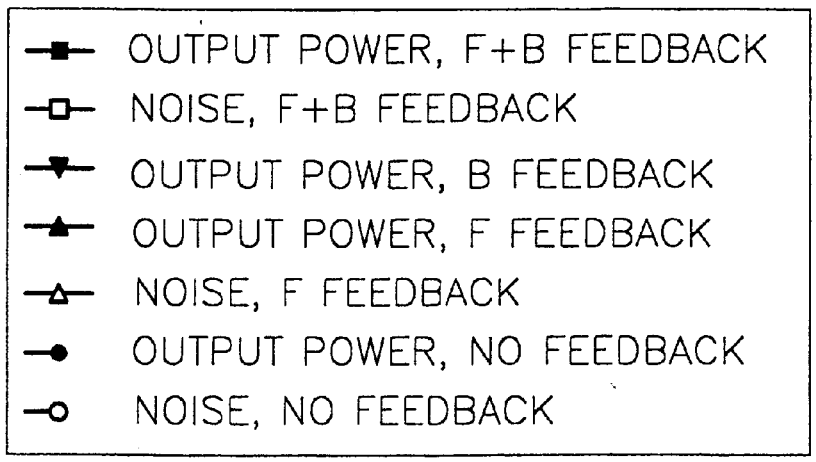

The reflector 470 is preferably a short period grating. The operation of the optical fiber amplifier shown in FIG. 4 is the same as that shown in FIG. 2, except that the reflector 470 operates differently from the reflecting unit 200 shown in FIG. 2. The reflector 470 selectively reflects the wavelength of the amplified spontaneous emission among the forward amplified spontaneous emission generated in the erbium doped optical fiber unit 440 and allows the same to feedback to the erbium doped optical fiber unit 440. The fed-back amplified spontaneous emission amplifies the long-wavelength signal light.FIG. 5 is a schematic diagram of a long-wavelength optical fiber amplifier according to still another embodiment of the present invention. The optical fiber amplifier shown in FIG. 5 includes a first reflector 500 for outputting input signal light and predetermined reflected light, a first laser diode 510 for generating pump light in the range of 1480 nm, a first wavelength selective coupler 520 for coupling the pump light in the range of 1480 mn to light output from the first reflector 500, a second laser diode 530 for generating pump light in the range of 980 nm, a second wavelength selective coupler 540 for coupling the pump light in the range of 980 nm to the light output from the first wavelength selective coupler 520, an erbium doped optical fiber unit 550, a third laser diode 560 for generating pump light in the range of 1480 nm, a third wavelength selective coupler 570 for outputting the pump light in the range of 1480 nm to the erbium doped optical fiber unit 550 and allowing the light output from the erbium doped optical fiber unit 550 to pass through the same, a second reflector 580 and an isolator 590.The first reflector 500 includes a 3 dB coupler 501, a circulator 502, atonable filter 503 and an attenuator 504. The erbium doped optical fiber unit 550 includes EDFs 551 and 553 and a second isolator 552 interposed between the erbium doped optical fibers 551 and 553. The lengths of the erbium doped optical fibers 441 and 443 are about 10 to 20 times longer than an erbium doped optical fiber used in an optical fiber amplifier having the wavelength range of 1550 nm.The second reflector 580 is preferably a short period grating and its reflection conditions are determined in consideration of reflection characteristics of the first reflector 500.FIG. 6 illustrates the power and noise figure of an amplified signal with respect to a flattened gain when signal light in the range of 1588.6 nm is incident to the optical fiber amplifiers shown in FIGS. 2, 4 and 5. The erbium doped optical fiber (EDF) is a Germanosilicate EDF. The wavelength of forward amplified spontaneous emission which is fed back to the optical fiber amplifier is 1553 nm and the wavelength of backward amplified spontaneous emission is 1548.6 nm.When the gain is set to about 19 dB and the total input signal power is about 1 dBm, feedback of amplified spontaneous emission does not affect the gain. However, when the gain is set to about 31 dB and the total input signal power is about −15 dBm, feedback of amplified spontaneous emission increases the gain by about 5 dB. When the total input signal power is about −20 dBm, the gain increasing effect becomes larger. Therefore, the feedback of amplified spontaneous emission is more advantageous in the case when the input signal power is small. According to the present invention, fewer laser diodes and optical devices are necessary in amplifying a signal light having a long wavelength, by providing a reflector for reflecting amplified a spontaneous emission. Also, the gain is increased in the case when the power of an input signal is small.While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is: 1. An apparatus, comprising:

an optical fiber having an input port and an output port, receiving signal light traveling in a first direction into said input port, amplifying the signal light using pump light, outputting amplified signal light from said output port;

a pumping unit being connected to said input and output ports, supplying the pump light to said input and output ports; and a reflecting unit being connected to said input port, receiving amplified spontaneous emission that is generated in said optical fiber and that is outputted from said input port in a second direction, coupling the amplified spontaneous emission with the signal light, conveying the amplified spontaneous emission coupled with the signal light to said input port in said first direction, said first direction being opposite to said second direction.2. The apparatus of claim 1, further comprising said optical fiber corresponding to an erbium doped optical fiber.3. The apparatus of claim 1, the signal light having a wavelength within the range of 1580 nanometers to 1589 nanometers. 4. The apparatus of claim 1, further comprising the signal light corresponding to a long-wavelength input signal.5. The apparatus of claim 1, the pump light further comprising:

first pump light having a wavelength of approximately 1480 nanometers;

second pump light having a wavelength of approximately 980 nanometers; and third pump light having a wavelength of approximately 1480 nanometers.6. The apparatus of claim 5, said pumping unit further comprising:

a first laser diode supplying the first pump light in said first direction to said input port of said optical fiber;

a second laser diode supplying the second pump light in said first direction to said input port of said optical fiber; and a third laser diode supplying the third pump light in said second direction to said output port of said optical fiber.

7. The apparatus of claim 6, said optical fiber further comprising an isolator reducing noise. 8. The apparatus of claim 1, said optical fiber further comprising an isolator reducing noise.9. The apparatus of claim 8, said reflecting unit further comprising:

a circulator having a first terminal receiving the amplified spontaneous emission from said optical fiber when the amplified spontaneous emission is conveyed in said second direction, having a second terminal outputting the amplified spontaneous emission received at said first terminal, having a third terminal receiving the signal light traveling in said first direction, said first terminal outputting signals received from said third terminal to said optical fiber in said first direction;

a filter receiving the amplified spontaneous emission from said second terminal of said circulator, said filter being tunable, said filter selecting a predetermined wavelength of the amplified spontaneous emission received from said second terminal, said filter outputting said selected predetermined wavelength of the amplified spontaneous emission;

an attenuator receiving the amplified spontaneous emission from said filter, adjusting power of the amplified spontaneous emission received from said filter, outputting the amplified spontaneous emission having adjusted power; and an optical coupler receiving the amplified spontaneous emission from said attenuator, receiving the signal light traveling in said first direction, coupling the amplified spontaneous emission with the signal light, conveying the amplified spontaneous emission coupled with the signal light to said third terminal of said circulator.

10. A long-wavelength optical fiber amplifier apparatus, comprising:

an optical fiber being erbium doped, said optical fiber amplifying a signal light using pump light, said optical fiber having an input port and an output port, said optical fiber receiving the signal light at said input port, the signal light traveling in a first direction;

a pumping unit having a first pump section connected to said input port and a second pump section connected to said output port, said pumping unit generating the pump light to excite erbium ions in said optical fiber; and a reflecting unit being connected to said second pump section, said reflecting unit receiving amplified spontaneous emission traveling in said first direction from said output port through said second pump section, the amplified spontaneous emission being generated in said optical fiber, said reflecting unit reflecting the amplified spontaneous emission back to said output port of said optical fiber in a second direction opposite to said first direction.

11. The apparatus of claim 10, said pumping unit further comprising: said first pump section having first and second laser diodes respectively supplying first and second pump light in said first direction to said input port of said optical fiber, the first pump light having a wavelength in a 1480 nanometer wavelength band, the second pump light having a wavelength in a 980 nanometer wavelength band; and said second pump section having a third laser diode supplying third pump light in said second direction to said output port of said optical fiber, the third pump light having a wavelength in a 1480 nanometer wavelength band.

12. The apparatus of claim 10, said optical fiber further comprising an isolator being positioned between said input and output ports, said isolator reducing noise, the signal light having a wavelength within the range of 1580 nanometers to 1589 nanometers.

13. The apparatus of claim 10, said reflecting unit further comprising a short period fiber grating selectively reflecting a wavelength of the amplified spontaneous emission received from said optical fiber.

14. The apparatus of claim 13, further comprising the amplified spontaneous emission reflected back to said optical fiber amplifying the signal light.

15. An apparatus, comprising:

an optical fiber having an input port and an output port, being doped with erbium, receiving signal light at said input port, amplifying the signal light using pump light, outputting amplified signal light at said output port, the signal light traveling in a first direction;

a pumping unit having a first pump section connected to said input port and a second pump section connected to said output port, said first and second pump sections generating the pump light to excite erbium ions in said optical fiber;

a first reflecting unit being connected to said first pump section, receiving first amplified spontaneous emission traveling in a second direction from said input port through said first pump section, coupling the first amplified spontaneous emission with the signal light, and conveying the first amplified spontaneous emission coupled with the signal light to said input port of said optical fiber, the first amplified spontaneous emission being generated in said optical fiber, said second direction being opposite to said first direction; and a second reflecting unit being connected to said second pump section, receiving second amplified spontaneous emission traveling in said first direction from said output port through said second pump section, and reflecting the second amplified spontaneous emission back to said output port of said optical fiber in said second direction, the second amplified spontaneous emission being generated in said optical fiber.

16. The apparatus of claim 15, said pumping unit further comprising:

said first pump section having first and second laser diodes respectively supplying first and second pump light in said first direction to said input port of said optical fiber, the first pump light having a wavelength of about 1480 nanometers, the second pump light having a wavelength of about 980 nanometers; and said second pump section having a third laser diode supplying third pump light in said second direction to said output port of said optical fiber, the third pump light having a wavelength of about 1480 nanometers.

17. The apparatus of claim 16, said optical fiber further comprising an isolator being positioned between said input and output ports, said isolator reducing noise, the signal light having a wavelength within the range of 1580 nanometers to 1589 nanometers.

18. The apparatus of claim 17, said first reflecting unit further comprising:

a circulator having a first terminal receiving the first amplified spontaneous emission from said optical fiber when the first amplified spontaneous emission is conveyed in said second direction, having a second terminal outputting the first amplified spontaneous emission received at said first terminal, having a third terminal receiving the signal light traveling in said first direction, said first terminal outputting signals received from said third terminal to said optical fiber in said first direction;

a filter receiving the first amplified spontaneous emission from said second terminal of said circulator, said filter being tunable, said filter selecting a predetermined wavelength of the first amplified spontaneous emission received from said second terminal, said filter outputting said selected predetermined wavelength of the first amplified spontaneous emission;

an attenuator receiving the first amplified spontaneous emission from said filter, adjusting power of the first amplified spontaneous emission received from said filter, outputting the first amplified spontaneous emission having adjusted power; and an optical coupler receiving the first amplified spontaneous emission from said attenuator, receiving the signal light traveling in said first direction, coupling the first amplified spontaneous emission with the signal light, conveying the first amplified spontaneous emission coupled with the signal light to said third terminal of said circulator.

19. The apparatus of claim 18, said second reflecting unit further comprising a short period fiber grating reflecting a wavelength selected from the second amplified spontaneous emission in accordance with reflection characteristics of said first reflecting unit.

20. The apparatus of claim 15, said second reflecting unit further comprising a short period fiber grating reflecting a wavelength selected from the second amplified spontaneous emission in accordance with reflection characteristics of said first reflecting unit.

* * * * *